Patented Nov. 13, 1945

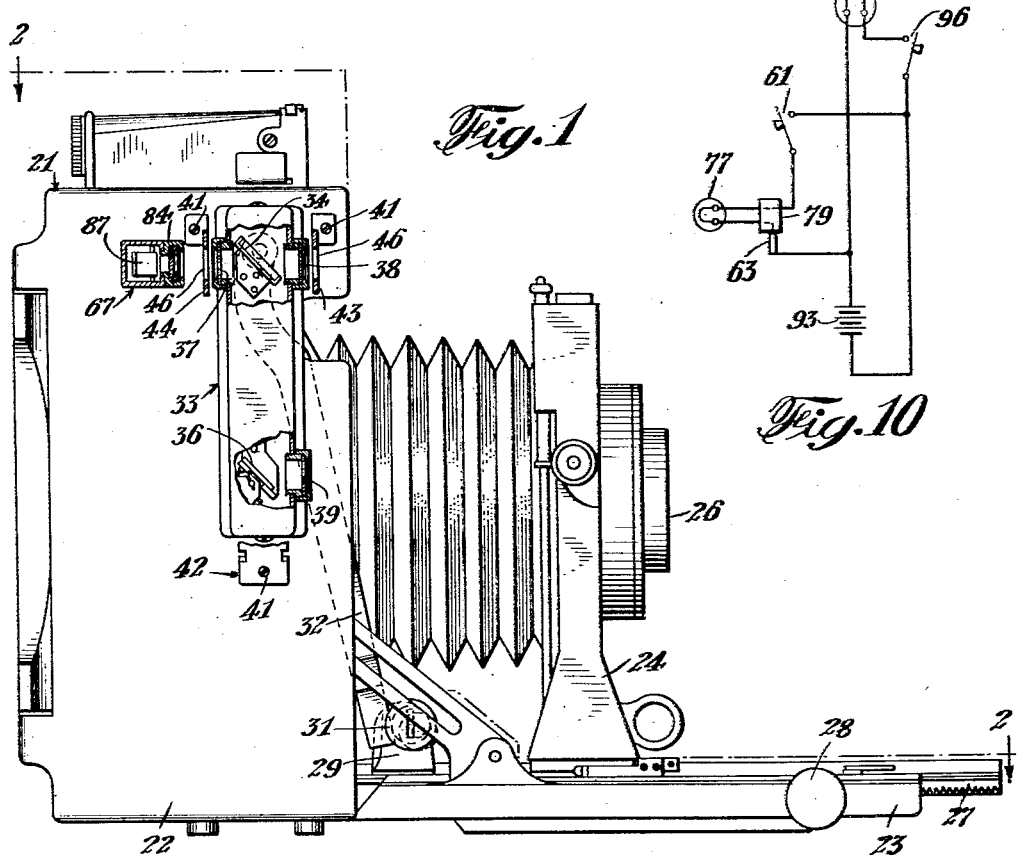
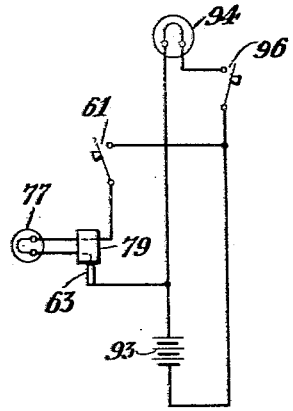
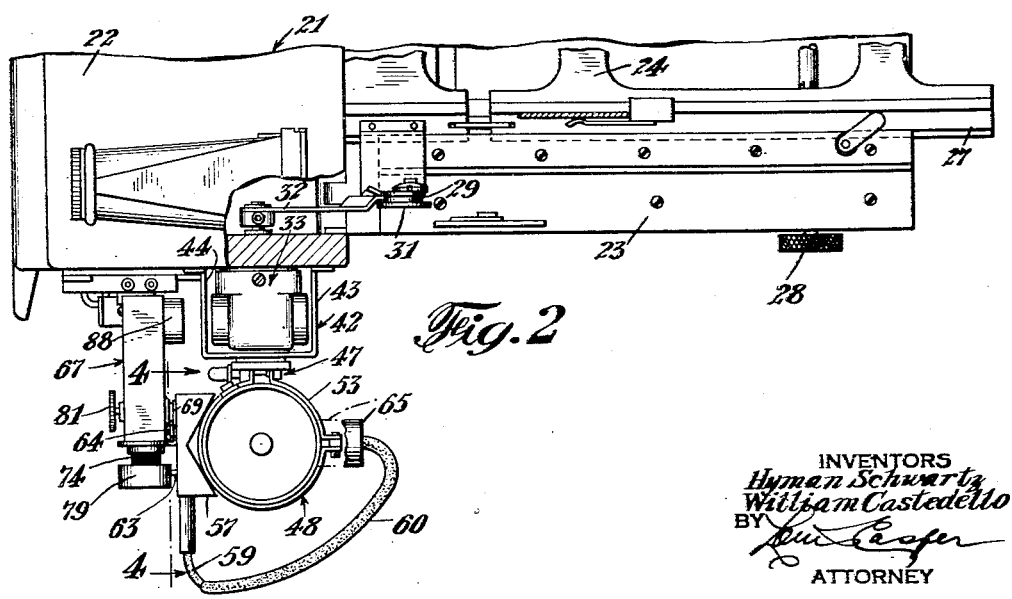

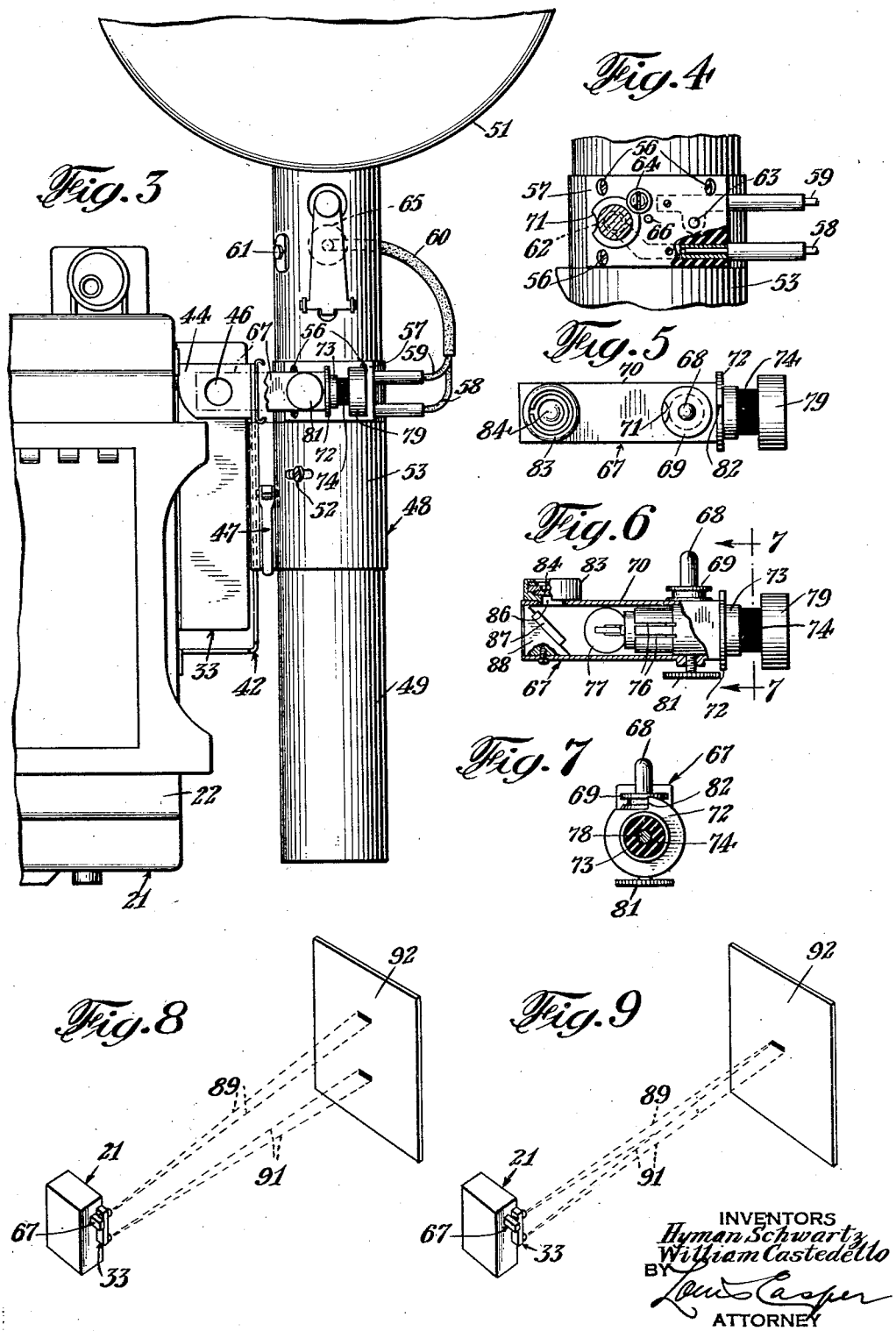

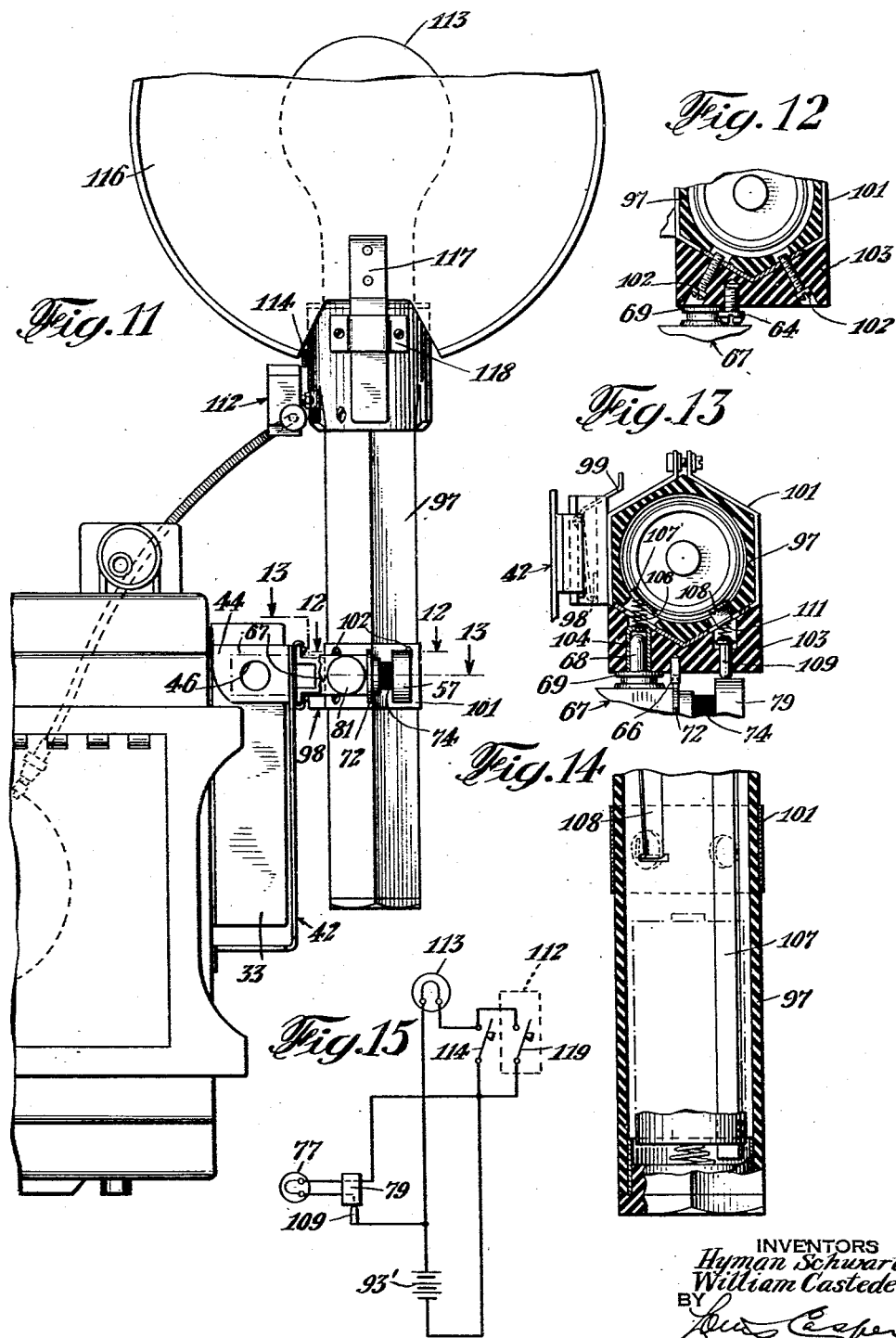

2,388,714

UNITED STATES PATENT OFFICE 2,388,714

RANGE FINDER FOR CAMERAS

Hyman Schwartz and William Castedello, Stamford, Conn., assignors to The Kalart Company, Inc., New York, N. Y., a corporation of New York Substituted for abandoned application Serial No. 420,158, November 24, 1941. This application January 27, 1943, Serial No. 474,048

9 Claims. (Cl. 95—44)

The present invention relates primarily to photographic devices and more particularly to a device whereby the proper focusing of a camera may be effected when the light conditions or the degree of illumination is insufficient and such as to preclude the satisfactory use of the usual focusing or measuring arrangements such as distance scales, ground glasses, range finders, or view finders.

The present application is a substitute application for the application filed November 24, 1941, bearing Serial No. 420,158.

One of the prerequisites for taking good pictures with sharp definition is to have the camera properly focused which includes positioning the lens of the camera the proper distance in front of the negative film. The positioning of a particular lens relative to the negative for sharp definition varies and is a function within predetermined limits of the distance of the object to be photographed from the camera. Devices such as distance scales, range finders, view finders, and so forth, have been developed which while assisting in the proper focusing and aiming of a camera require for their satisfactory operation a certain minimum degree of illumination and do not function satisfactorily unless at least the minimum amount of illumination is present.

Accordingly, it is one of the primary objects of the present invention to provide a device which enables the use of measuring arrangements, such as range finders, under light conditions which would preclude the use of the range finder without the device.

Another object of the present invention is to provide a device which will co-operate with a range finder and enable the use thereof under dark conditions and which may readily be arranged to permit the use of the range finder in the normal manner under normal light conditions.

Still another object of the invention is to provide a device which may readily be attached to a photoflash bulb unit or apparatus to be operated by the battery included therein when the same is used in conjunction with a camera.

Still another object of the invention is to provide a device which while using current from the battery of a photoflash unit during the operation thereof and the determining of the range of the object to be photographed is automatically disconnected from the battery when in a nonoperating position.

Still another object of the invention is to provide a device which assists in the proper aiming of the camera at the object to be photographed when the light conditions are such as to preclude the usual aiming of the camera with a view finder or ground glass.

These and still other objects of the invention will be more apparent hereinafter in the detailed description thereof wherein reference is made to the accompanying drawings, in which:

Fig. 1 is a side elevational view of a camera with a range finder attached thereto, partly in section, showing the operating position of the light producing unit of the present invention relative thereto;

Fig. 2 is a plan view of the camera taken substantially on line 2—2 of Fig. 1, showing a range finder, a photoflash unit, and the manner in which they co-operate with the device of the present invention;

Fig. 3 is a rear elevational view of the elements of Fig. 2;

Fig. 4 is a vertical sectional view taken substantially on line 4—4 of Fig. 2;

Fig. 5 is a front detailed view of the light producing unit of the present invention;

Fig. 6 is a sectional view taken substantially through the center of the light producing unit;

Fig. 7 is a sectional view taken substantially on line 7—7 of Fig. 6;

Figs. 8 and 9 are diagrammatic views illustrating the principles of operation of the present invention;

Fig. 10 is a wiring diagram showing the electrical connections between the light producing unit, the photoflash unit battery, the photoflash lamp, and the various switches;

Fig. 11 is a rear elevational view showing a modified arrangement of the invention;

Fig. 12 is a sectional view taken on line 12—12 of Fig. 11;

Fig. 13 is a sectional view taken on line 13—13 of Fig. 11;

Fig. 14 is a sectional view of the lower part of the casing of the photoflash unit; and Fig. 15 is a wiring diagram of the electrical connections between the various units as employed in the modified arrangement of the invention.

Referring first to Figs. 1 and 2, a camera, indicated in general by reference numeral 21, is shown in its open condition. The camera comprises a casing 22, a bed 23, and a lens board or support 24 movable toward and away from the focal plane to correctly position a lens 26 carried therein the proper distance in front of the sensitized film in the camera when focusing the same. The movement of the lens support 24 back and forth along the camera bed 23 is accomplished by means of racks 27 which engage pinions (not shown) rotated by means of focusing knobs 28. Movable in and out with the lens support 24 is a bracket 29 attached to the movable track element on the camera bed which carries adjacent its upper end an eccentric shoulder screw 31. Engageable with the shoulder screw 31 is the lower end of a coupling lever 32 which controls a range finder indicated in general by reference numeral 33 attached to the left hand side of the camera casing 22 as viewed from the front of the camera.

The camera 21, shown in the drawings, is of the type known in the art as a Speed Graphic and the range finder 33 is preferably of the type disclosed in a copending application of M. Schwartz and W. Castedello, Ser. No. 418,516, filed November 10, 1941, and although the invention is shown and hereinafter described as co-operating with this type of camera and range finder, it will be obvious hereinafter that the invention is not limited in its application to these particular range finder and camera units but may be applied to various other types of cameras employing coupled range finders.

The range finder 33 includes a stationary silver-flecked mirror 34 mounted at an angle of approximately 45° and a pivotable mirror 36 in the lower part of the range finder which is pivoted in accordance with a predetermined relationship to the position of the lens 26. The manner of pivoting the movable mirror 36 in accordance with the position of the lens 26 is fully described in the above mentioned copending application. The coupling lever 32 controls the pivoting of the mirror 36 during a predetermined part of the movement of the lens support 24 or until the shoulder screw 31 is moved sufficiently to be disengaged from the lever 32. Located in the upper part of the range finder casing in line with the silver-flecked mirror 34 is a rear window 37 and a front window 38. A lower front window 39 is also supported in the casing of the range finder opposite the movable mirror 36.

In the normal use of the range finder, the object to be photographed is sighted through the rear or left hand window 37, Fig. 1, the silver-flecked mirror 34 and the window 38. At the same time an image of the object is also reflected from the movable mirror 36 and the back of the silver-flecked mirror 34 through the rear or left hand window 37 to the eye. When the lens support 24 is so positioned to control the range finder so that the object viewed directly and the image thereof as reflected from the movable mirror 36 are superimposed on each other, the camera lens is at the proper position relative to the camera casing or the camera is properly focused on the object. Of course, the range finder has to be synchronized with the camera lens 26 in order to obtain the proper focus, the adjustments for properly synchronizing the range finder with the particular lens in the camera being fully described in the above-mentioned copending application.

Also attached to the camera by means of screws such as 41 is a photoflash unit bracket 42. The bracket 42, best shown in Figs. 2 and 3, has sections 43 and 44 thereof extending on either side of the range finder adjacent the windows 38 and 37, respectively, in the upper end thereof. Openings or holes 46 are formed in the sections 43 and 44 of the bracket 42 in order to permit a clear view through the windows 37 and 38. Attached to the vertical section of the bracket 42 by means of a clamping mechanism indicated in general by reference numeral 47 is a photoflash unit 48. The photoflash unit includes a battery casing 49, the reflector 51 and various other elements hereinafter described. Attached to the battery casing 49 by means of screws such as 52 is a band 53 which surrounds the battery casing and forms a part of the clamping mechanism 47.

Secured to the band 53 above the clamping mechanism 47 by means of screws 56 is a block 57, Figs. 2, 3 and 4, composed of insulating material such as Bakelite, to which is connected electrical conductors 58 and 59. The two conductors 58 and 59 are formed into a cable 60 and are connected to the battery casing by means of a plug 65. One of the conductors such as 58 is connected to one of the poles of the battery in the battery casing 49 while the other conductor such as 59 is connected through a switch such as 61 to the opposite pole of the battery. The ends of the conductors 58 and 59, Fig. 4, which terminate in the insulating block 57 are electrically connected to a sleeve 62 and a pin 63 respectively. The sleeve 62 is recessed in the block 57 and the pin 63 protrudes therefrom. A spring (not shown) is associated with the pin 63 and normally tends to keep the pin in an extended position, the spring permitting the pin to be pushed into the block 57. Also extending from the block 57 is a flat-headed screw 64 and a stop pin 66.

Adapted to be associated with the block 57 and electrically connected to the conductors 58 and 59 in a manner hereinafter described is a light unit indicated in general by reference numeral 67, Figs. 3, 5 and 6. The light unit 67 is square in cross-section and has a pin 68 extending therefrom adapted to be inserted in the sleeve 62 on the block 57. Formed on the pin is a flanged shoulder 69 which has a notch 71 therein, Figs. 4 and 5, which co-operates with the head of the screw 64 to lock the light unit to the block in a manner hereinafter pointed out.

The casing of the light unit 67 is of metal and secured to the right end thereof is a collar 72. The collar 72 has a circular hole therein substantially the same in diameter as the inside dimension of the casing 70 of the light unit 67. Adapted to fit into the light unit casing 67 through the hole in the collar 72 is a sleeve 73. The right hand end of the sleeve 73, as shown in Fig. 6, has a piece of Bakelite or similar insulating material 74 extending therein to approximately the longitudinal center thereof. The Bakelite cylinder 74 is forced into the sleeve 73 so as to be movable therewith. The left hand end of the sleeve 73 is slightly less in diameter than the main portion thereof and has slots such as 76 formed axially thereof. The slots 76 enable the sleeve 73 to hold a small bulb 77 of the type employed in flashlights in the left hand end of the sleeve. Extending through the Bakelite cylinder 74 is a rod 78, Fig. 7, which contacts the center tip of the bulb 77. The other end of the rod 78 is secured to a disc 79 which is in turn secured to the right hand end of the Bakelite cylinder 74. The sleeve 73, the Bakelite cylinder 74 and the metal disc 79 are formed into a unit and also movable longitudinally of the light unit. The movement of these elements together with the bulb 77 permits adjustment thereof for proper focusing of a light beam from the bulb 77 in a manner hereinafter pointed out. A clamping screw 81 threaded into the casing of the light unit clamps the sleeve 73 in its adjusted position.

In attaching the light unit 67 to the block 57 on the battery casing, the pin 68 on the light unit is inserted part way in the sleeve 62 in the block 57. The unit is then positioned at an angle of about 45° to the right with the notch 71 in the flanged shoulder 69 of the pin in line with the head of the screw 64. With the light unit in this position the pin 68 may be inserted the full depth in the sleeve 62 or until the face of the shoulder 69 abuts the Bakelite block 57 as shown in Fig. 2. The head of the screw 64 is not seated against the block 57 but is spaced a slight distance therefrom substantially equal to the thickness of the shoulder 69. With the pin 68 inserted in the sleeve the full depth thereof the light unit 67 may be pivoted about the pin in a counter-clockwise direction as shown in Fig. 3. The flanged part of the shoulder 69 passes underneath the head of the screw 64 to lock the same to the block 57 and prevents removal of the light except when the said unit is in a position of approximately 45° to the right.

The collar 72 as shown in Fig. 7 has a notch 82 therein and when the light unit is pivoted on the pin 68 to a position such as that shown in Figs. 2 and 3, the notch 82 engages the stop pin 66 to prevent further pivoting of the light unit in a counter-clockwise direction, and in this position the axis of the light unit is substantially horizontal. Just before the light unit 67 is pivoted into its horizontal position, as shown in Fig. 3, the disc 79 on the right hand end thereof moves into operative relation with the spring-pressed pin 63 to establish an electrical connection between the pin and the disc. The establishing of the electrical connection completes a circuit between the two conductors 58 and 59 through the bulb 77 in the light unit, the disc 79 being in electrical connection with the center terminal of the bulb through the rod 78 and the pin 68 being in electrical connection with the other terminal of the bulb through the sleeve 73. With such an arrangement the bulb can be lighted only in or near its operative position and such an arrangement is very advantageous as it prevents unnecessary use of the battery in the battery casing 49 and also prevents undesirable illumination of the object to be photographed which is a desirable feature especially if time exposures are being made.

Secured to the casing of the light unit 67 adjacent the left hand end thereof as shown in Figs. 5 and 6 is a lens holder 83 which contains a lens 84. The lens 84 and holder 83 are axially positioned relative to a hole 86 in the casing located directly above a mirror 87 supported on a block 88. The mirror is positioned at an angle of approximately 45° as shown in Fig. 6 so as to reflect light from the bulb 77 through the hole 86 and lens 84.

In the operation of the invention the light from the bulb 77 shines into the range finder 33 and part of the light beam passes through the stationary silver-flecked mirror 34, Fig. 1, directly to the object to be photographed, while the rest of the light beam is reflected from the mirror 34 down onto the movable mirror 36 and then out through the window 39 in the direction of the object to be photographed. Figs. 8 and 9 illustrate diagrammatically the manner in which the two light beams are projected from the range finder 33. In Fig. 8 the two light beams 89 and 91 are directed to different positions on the object 92. Movement of the lens support 24 of the camera pivots the movable mirror 36 and when the lens support is positioned and the mirror 36 so pivoted that the two beams 89 and 91 are directed to a single spot on the object 92, as in Fig. 9, the lens will be at the proper distance with respect to the negative in the camera for an object located such a distance from the camera. Thus all that is necessary when it is desired to photograph an object is to project the two light beams from the range finder and move the lens of the camera either in or out as the case may be until the two beams are directed to but a single spot on the object. With the lens of the camera properly synchronized with the range finder, the two beams of light from the range finder coincide at a point a given distance from the camera which is proportional to or a function of the distance between the lens and the negative. By this arrangement focusing of the camera may be properly effected where the light conditions are such as to prevent the normal focusing thereof, and such an arrangement has an obvious advantage in that illumination of the object to the degree required for the use of the normal measuring arrangements is not necessary. Another advantage is that the upper light beam is substantially parallel to the axis of the camera lens so that the camera is aimed at substantially the same spot as the upper light beam.

Fig. 10 illustrates the electrical connections in the apparatus shown in the first embodiment of the invention, wherein a battery 93 employed to ignite the photoflash bulb 94 on closing of a switch 96 is also employed to illuminate the light bulb 77. The closing of the switch 61 completes a circuit from one pole of the battery 93 through the bulb 77 back to the other pole of the battery. The pin 63, Figs. 2, 4 and 10, constitutes an auxiliary safety switch which prevents illumination of the bulb 77 in a non-operative position of the light unit 67.

The second modification of the invention as shown in Figs. 11 to 15 has certain advantages over the first modification shown in Figs. 1 to 10. In the second modification, Figs. 11 to 15, the battery casing 97 is attached to the bracket 42 surrounding the range finder 33 by means of a clamping mechanism indicated in general by reference numeral 98. The clamping mechanism 98 includes a lever 99 which releases the battery casing for removing the same from the bracket 42. The clamping mechanism also includes a band 101 surrounding the battery casing 97 which holds the battery casing in position. Attached to the band 101 by screws such as 102, Fig. 12, is a block of insulating material 103. A metal sleeve 104 in the block 103 is connected by means of a compression spring 106 in the inner end thereof to a metal strap 107 which at its lower end is connected to one of the poles of the battery in the casing 97. The casing 97 is of insulating material such as Catalin, and an electrical connection between the bottom of the battery cells, as shown in Fig. 14, to the upper end of the battery casing is by means of the metal strap 107. A pin 109 with a shoulder on the inner end thereof is carried in the block 103 and connected by means of a compression spring 111 to the lower end of another metal strap 108 inside the casing 97. The upper end of the strap 108 is connected to the center terminal of the upper battery cell. Thus the sleeve 104 and the pin 109 have the opposite poles of the battery in the battery casing 97 applied thereto and when the light unit 67 is mounted on the block 103 in the same manner as it is mounted on the block 57 in the first embodiment of the invention, the bulb 77 therein will be in an electric circuit which includes the battery. With the arrangement shown in Figs. 11 to 15, no outside electrical connection is required to the light unit 67 such as the cable containing the conductors 58 and 59 in the first embodiment, and the second embodiment obviously has an advantage over the first embodiment. The compressible pin 109 in the block 103 permits the completion of a circuit to the bulb 77 in the light unit only just before and when the unit is in an operative position or the position with the lens 84 therein substantially opposite the sighting window of the range finder 33. The light unit 67 is locked and positioned on the block 103 in the second modification in the same manner as it is attached to the block 57 in the first modification.

The embodiment shown in Figs. 11 to 15 also includes a synchronizing unit indicated in general by reference numeral 112 which may be of the type disclosed in a copending application of M. Schwartz et al., Ser. No. 403,819, filed July 24, 1941, now Patent No. 2,321,945 dated June 15, 1943, which synchronizes the peak combustion of the photoflash bulb 113 with the operation of the camera shutter. The unit 112 is attached to the upper end of the battery casing 97 just below an auxiliary switch 114 which permits ignition of the photoflash bulb 113 independently of the shutter tripping. The photoflash bulb has associated therewith a reflector 116 which is attached to the battery casing 97 by means of a spring member 117 extending through a bracket 118 on the upper end of the battery casing.

The electrical connections of the second embodiment of the invention are shown in Fig. 15 wherein potential from the battery 93' is connected by means of the pin 109 to the disc 79 of the light unit and through the bulb 77 to the other pole of the battery. The switch 114 and the switch 119 in the flash unit 112 are in parallel and control the circuit to the flash bulb 113.

Another advantage of the second embodiment is that no operating switch is employed in the circuit to the bulb 77, the circuit to the bulb 77 being completed when the light unit is moved to its operative position and the circuit being broken when the light unit is in any other position. This arrangement eliminates the necessity of wire and cable connections to the light unit which are a source of potential failure.

It is obvious, of course, that various other modifications of the invention may be made without departing from the spirit or essential attributes thereof and it is desired, therefore, that only such limitations be placed thereon as are imposed by the prior art or are specifically set forth in the appended claims.

What is claimed is:

1. In combination with a camera having a focusing lens movable relative to the casing thereof, a range finder having a sighting window and two objective windows, said range finder being controllable in a predetermined manner by the focusing movement of said lens, a photoflash unit including a battery, a light unit including a light bulb connectable with said battery, means for pivotally moving said light unit into operative relation with the sighting window of said range finder whereby a beam of light from said bulb may be directed into said range finder through said sighting window, a stop for limiting pivotal movement of said light unit when in position to direct the light beam into said range finder through the sighting window thereof, means in said range finder for dividing said beam of light into two separate beams and directing the same out through the two objective windows of said range finder and means including the control of said range finder by the movement of said focusing lens whereby the two light beams merge at the focal point of said lens relative to the position thereof with respect to the camera negative.

2. The combination as set forth in claim 1 and means including the movement of said light unit into operative relation with said sighting window to complete a circuit to the light bulb therein from said battery.

3. The combination as set forth in claim 1 and an electrical circuit between said battery and said bulb in said light unit, a safety switch and a manually operable switch in series relation in said circuit and means controlled by the position of said light unit for closing said safety switch only when in operative relation with said sighting window whereby the operation of said manually operable switch is ineffective to complete a circuit from said battery to said bulb with said light unit in any other position.

4. The combination of a range finder of the type described and a light unit for producing a beam of light for use in conjunction with said range finger, a pin and a cooperating recess for supporting said light unit in spaced relation relative to said range finder, said pin and recess permitting removal of said light unit from association with said range finder, an electric bulb in said light unit, means for pivoting said light unit on said pin to move the same into and out of position to direct the beam of light therefrom into said range finder, and means for completing a circuit to the bulb in said light unit only when the same is substantially in position to direct a beam of light therefrom into said range finder.

5. The combination of a range finder of the type described and a light unit for producing a light beam for use in conjunction with said range finder, a pin projecting from said light unit, a member fixed relative to said range finder and adapted to receive said pin whereby said light unit is pivotally mounted, a source of potential for the light bulb in said light unit, means including said pin for establishing a circuit from one terminal of said source to a terminal of said bulb and means operative with said pin in said member and said light unit pivoted into predetermined relationship with said range finder to complete a circuit from the other terminal of said source to the other terminal of said bulb whereby the same is illuminated to produce a light beam for use in conjunction with said range finder.

6. The combination of a range finder of the type described and a light unit for producing a light beam for use in conjunction with said range finder, a pin projecting from said light unit, a light unit mounting member fixed relative to said range finder and having a recess adapted to receive said pin, said pin and recess enabling said light unit to pivot relative to said mounting member and range finder, a flanged element on said light unit concentric with said pin and having a notch therein, a headed element on said mounting member and co-operating with said flanged element to permit insertion of said pin in said member greater than a predetermined distance only with said light unit in a predetermined pivoted position relative thereto and to lock said light unit to said mounting member on the pivoting thereof after the insertion of said pin in said member a still further predetermined amount.

7. The combination of a range finder of the type described and a light unit for producing a light beam for use in conjunction with said range finder, a pin projecting from said light unit, a light unit mounting member fixed relative to said range finder and having a recess adapted to receive said pin, said pin and recess enabling said light unit to pivot relative to said mounting member and range finder, means for enabling insertion of said pin in said member a predetermined distance only with said light unit in a predetermined pivoted position relative thereto, means operative after the insertion of said pin in said mounting member said predetermined distance and the pivoting thereof relative to said mounting member to lock the same thereto, a source of potential for the bulb in said light unit and means for completing a circuit from said source to said bulb to illuminate the same only with said light unit locked to said mounting member.

8. The combination of a range finder of the type described and a light unit for producing a light beam for use in conjunction with said range finder, a support for said light unit, said unit and support having a pin and a cooperating recess whereby said unit is pivotable relative to said support about a point spaced from the sighting window of said range finder and whereby said unit is movable to direct the light beam from the same into said sighting window, and means for locking said pin in said recess and said light unit to said support when pivoted to the position for directing the light beam therefrom into said range finder.

9. The combination of a range finder of the type described and a light unit for producing a light beam for use in conjunction with said range finder, a support for said light unit, said unit and support having a pin and a cooperating recess whereby said unit is pivotable relative to said support about a point spaced from the sighting window of said range finder and whereby said unit is movable to direct the light beam from the same into said sighting window, a source of potential for the light producing element in said light unit, means including said pin and recess for establishing a circuit from one terminal of said source to said light producing element and means operative to complete a circuit from the other terminal of said source to said light producing element only when said light unit is locked to said support and substantially only in position to direct the light beam therefrom into said range finder.

WILLIAM CASTEDELLO.
HYMAN SCHWARTZ.